United States Patent
Passe et al.

(10) Patent No.: US 10,349,277 B1
(45) Date of Patent: Jul. 9, 2019

(54) INTELLIGENT FACILITY DEVICE

(71) Applicant: Securus Technologies, Inc., Dallas, TX (US)

(72) Inventors: Scott Passe, Forney, TX (US); Luke Keiser, Frisco, TX (US)

(73) Assignee: Securus Technologies, Inc., Carrollton, TX (US)

( * ) Notice: Subject to any disclaimer, the term of this patent is extended or adjusted under 35 U.S.C. 154(b) by 344 days.

(21) Appl. No.: 13/931,858

(22) Filed: Jun. 29, 2013

(51) Int. Cl.
*H04M 1/66* (2006.01)
*H04W 12/08* (2009.01)
*H04W 52/38* (2009.01)

(52) U.S. Cl.
CPC ........... *H04W 12/08* (2013.01); *H04W 52/38* (2013.01)

(58) Field of Classification Search
CPC ........................... H04W 52/367; H04B 5/0062
USPC ......................................................... 455/522
See application file for complete search history.

(56) References Cited

U.S. PATENT DOCUMENTS

| | | | |
|---|---|---|---|
| 7,444,669 B1 | 10/2008 | Bahl et al. | |
| 7,734,306 B2 * | 6/2010 | Olson | H04L 63/0492 455/41.2 |
| 8,000,658 B2 * | 8/2011 | Kimura | H04W 52/283 455/522 |
| 8,644,875 B2 * | 2/2014 | Kiukkonen et al. | 455/522 |
| 8,793,774 B1 | 7/2014 | Kumar et al. | |
| 8,832,374 B1 | 9/2014 | Schaefers | |
| 8,869,253 B2 | 10/2014 | Atkinson | |
| 9,094,569 B1 | 7/2015 | Humphries | |
| 9,117,216 B1 | 8/2015 | Nguyen et al. | |
| 2006/0023651 A1 | 2/2006 | Tsuchiuchi et al. | |
| 2009/0222659 A1 | 9/2009 | Miyabayashi et al. | |
| 2010/0087145 A1 * | 4/2010 | Ikeda | 455/41.2 |
| 2011/0086614 A1 | 4/2011 | Brisebois et al. | |
| 2013/0176956 A1 | 7/2013 | Yamamoto | |
| 2013/0194377 A1 | 8/2013 | Humphries | |
| 2013/0263227 A1 | 10/2013 | Gongaware et al. | |
| 2013/0347073 A1 | 12/2013 | Bryksa | |
| 2014/0280758 A1 | 9/2014 | Sharma et al. | |

\* cited by examiner

*Primary Examiner* — Huy C Ho
(74) *Attorney, Agent, or Firm* — Fogarty LLP

(57) ABSTRACT

Embodiments of intelligent facility devices and associated methods and systems are described. In one embodiment a method includes receiving a request for access to a network from a user interface device. The method may also include determining an authorized transceiver power level for communicating with the user interface device in response to the request. Additionally, the method may include dynamically setting a transceiver power in response to the determination. The method may also include communicating with the user interface device at the authorized transceiver power level.

23 Claims, 5 Drawing Sheets

INTELLIGENT FACILITY DEVICE

BACKGROUND

This application is related by subject matter to co-pending non-provisional U.S. patent application Ser. No. 13/931,855 entitled "Intelligent Facility Device," filed contemporaneously herewith, which is incorporated, in its entirety, herein by reference.

Secure facilities often face security risks and challenges that go beyond those faced in conventional environments. Security threats can come from both external and internal sources. Often the internal threats are more concerning than external threats. This is particularly the case in correctional facility environments, where inmates may attempt to harm other people or property.

In certain situations, residents of secure facilities may be given access to computing devices, such as personal tablet devices. The residents may use the tablet devices to access media, documents, books, account information, and other types of information. Conventional tablet devices may include wireless communication capabilities for allowing the resident to access facility information systems.

The resident's access to the facility information systems may be restricted or limited. For example, residents of secure facilities are often restricted to access of internal networks. Also, other content restrictions may be placed on the resident. Usage timing or duration limits may also be placed on the resident.

One particular security risk may include a resident attempting to circumvent or otherwise attack or hack usage limitations or restrictions. Additional risks include residents attempting to conduct unauthorized communications, either with other residents of the facility or with external contacts. Residents may also attempt to gain access to facility account information, or other sensitive information, without authorization. Many such risks exist, and indeed, many such risks may be unknown to system administrators at the time that security policies are implemented.

In many environments, residents may be granted limited access to the facility information systems through wireless access points. Conventional wireless access points may not have sufficient security features for implementation in a secure facility environment because of the risks described above, and because of many other risks.

SUMMARY

Embodiments of intelligent facility devices and associated methods and systems are described. In one embodiment a method includes receiving a request for access to a network from a user interface device. The method may also include determining an authorized transceiver power level for communicating with the user interface device in response to the request. Additionally, the method may include dynamically setting a transceiver power in response to the determination. The method may also include communicating with the user interface device at the authorized transceiver power level.

In an embodiment, the method may also include determining an authorized duration of network access for the user interface device, and limiting communication with the user interface device at the authorized transceiver power level for the authorized duration. Limiting communication may include reducing the transceiver power level upon expiration of the authorized duration.

In an embodiment, dynamically setting the transceiver power may include increasing the transceiver power to a level that is sufficient for communication with the user interface device within an authorized physical range of the transceiver. The authorized range may be determined in response to a location of the transceiver. In another embodiment, the authorized range is determined in response to a privilege setting associated with the user interface device. In still another embodiment, the authorized range is determined in response to a privilege setting associated with a user of the user interface device.

An embodiment of a system includes an interface, a transceiver controller, coupled to the interface, and a transceiver coupled to the transceiver controller. In an embodiment, the interface may receive a request for access to a network from a user interface device. The transceiver controller may determine an authorized transceiver power level for communicating with the user interface device in response to the request, and to dynamically set a transceiver power in response to the determination. The transceiver may communicate with the user interface device at the authorized transceiver power level.

In an embodiment, the transceiver controller is further configured to determine an authorized duration of network access for the user interface device, and limit communication with the user interface device at the authorized transceiver power level to the authorized duration. The transceiver controller may also reduce the transceiver power level upon expiration of the authorized duration. Additionally, the transceiver controller may increase the transceiver power to a level that is sufficient for communication with the user interface device within an authorized physical range of the transceiver.

In an embodiment, the transceiver controller is configured to determine the authorized range in response to a location of the transceiver. In another embodiment, the transceiver controller may determine the authorized range in response to a privilege setting associated with the user interface device. In another embodiment, the transceiver controller may determine the authorized range in response to a privilege setting associated with a user of the user interface device.

In an embodiment, the interface includes a Radio Frequency Identification (RFID) subsystem configured to receive the request from the user interface device. The RFID subsystem may receive user authentication information from the user interface device.

BRIEF DESCRIPTION OF THE DRAWINGS

Figure 1A:
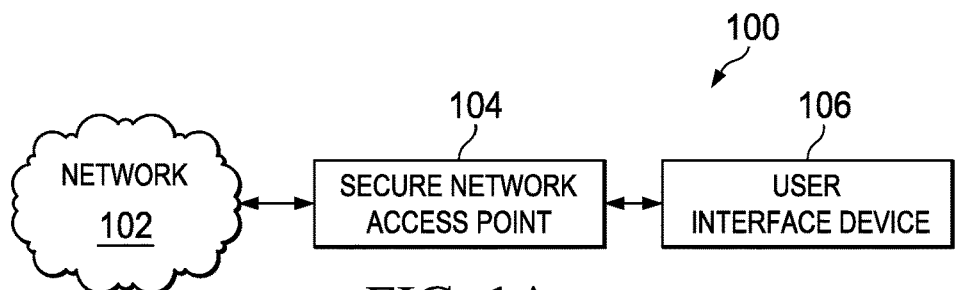

Having thus described the invention in general terms, reference will now be made to the accompanying drawings, which are not necessarily drawn to scale, and wherein:

FIG. 1A is a schematic block diagram illustrating one embodiment of a computing system having improved network security.

Figure 1B:
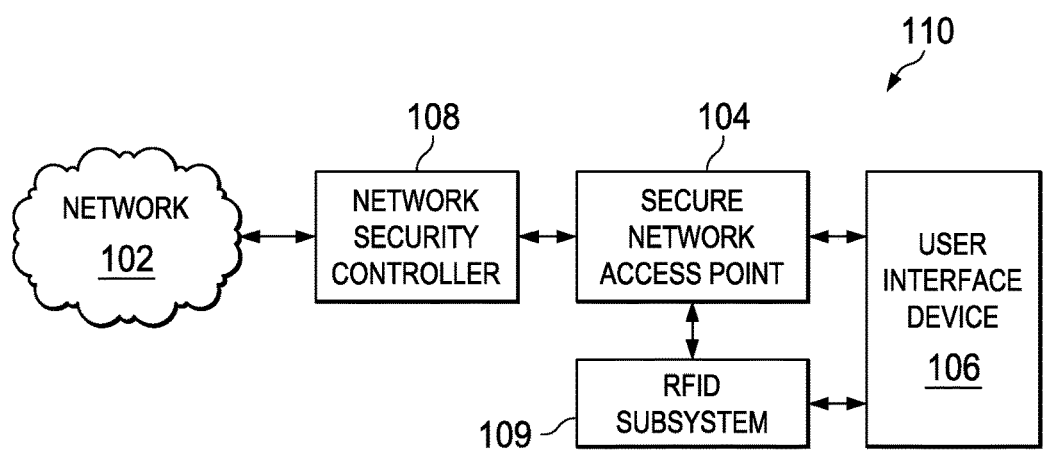

FIG. 1B is a schematic block diagram illustrating one embodiment of a computing system having improved network security.

Figure 1C:
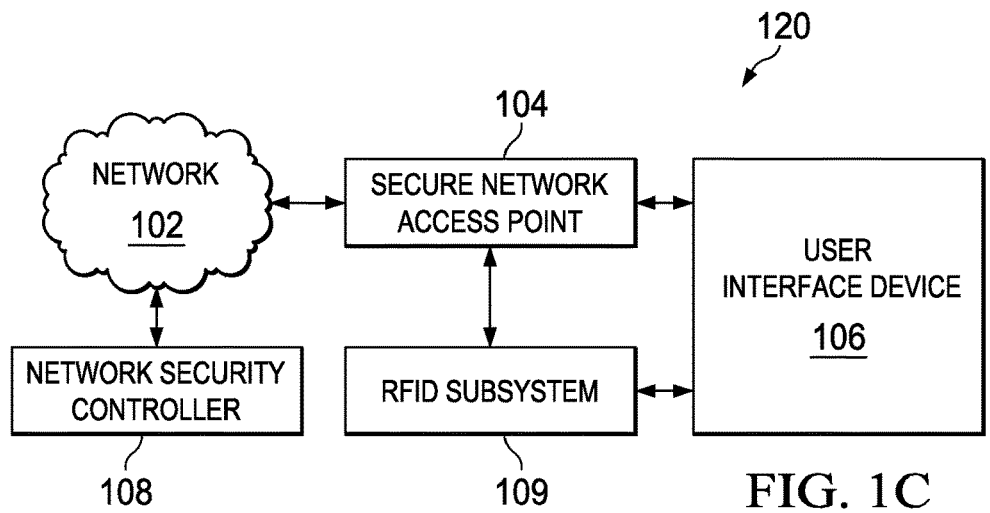

FIG. 1C is a schematic block diagram illustrating one embodiment of a computing system having improved network security.

Figure 2A:
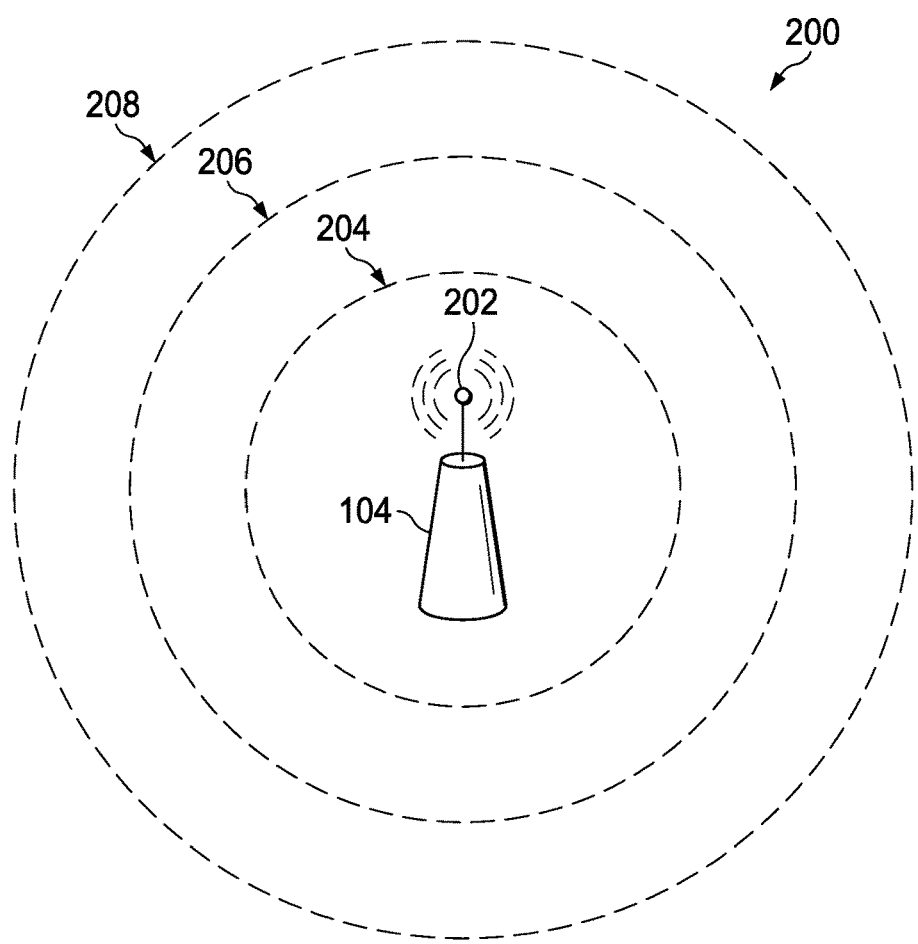

FIG. 2A is a schematic diagram illustrating one embodiment of a secure network access point with dynamic communication range.

Figure 2B:
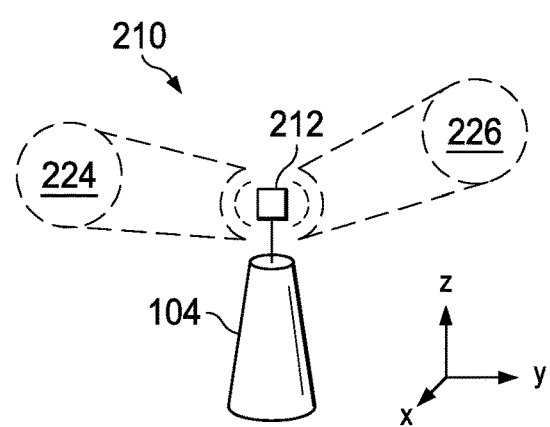

FIG. 2B is a schematic block diagram illustrating another embodiment of a secure network access point with dynamic communication range.

Figure 3:
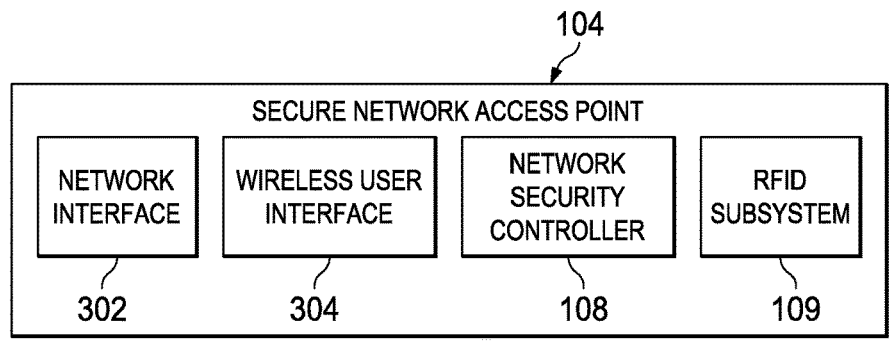

FIG. 3 is a schematic block diagram illustrating one embodiment of a secure network access point.

Figure 4:
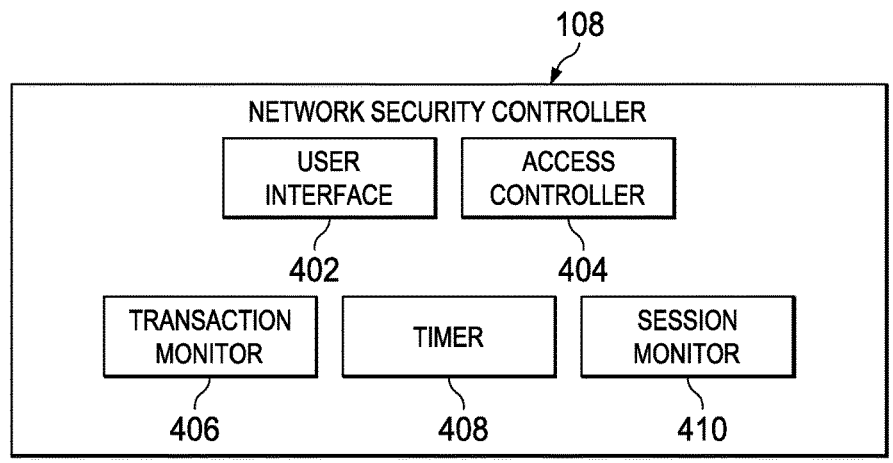

FIG. 4 is a schematic block diagram illustrating one embodiment of a network security controller.

Figure 5:
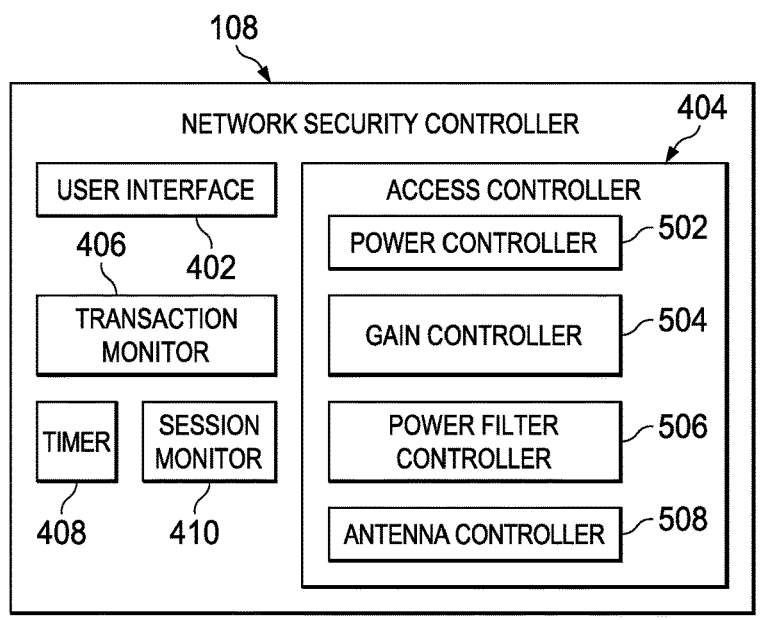

FIG. 5 is a schematic block diagram illustrating one embodiment of a network security controller.

Figure 6:
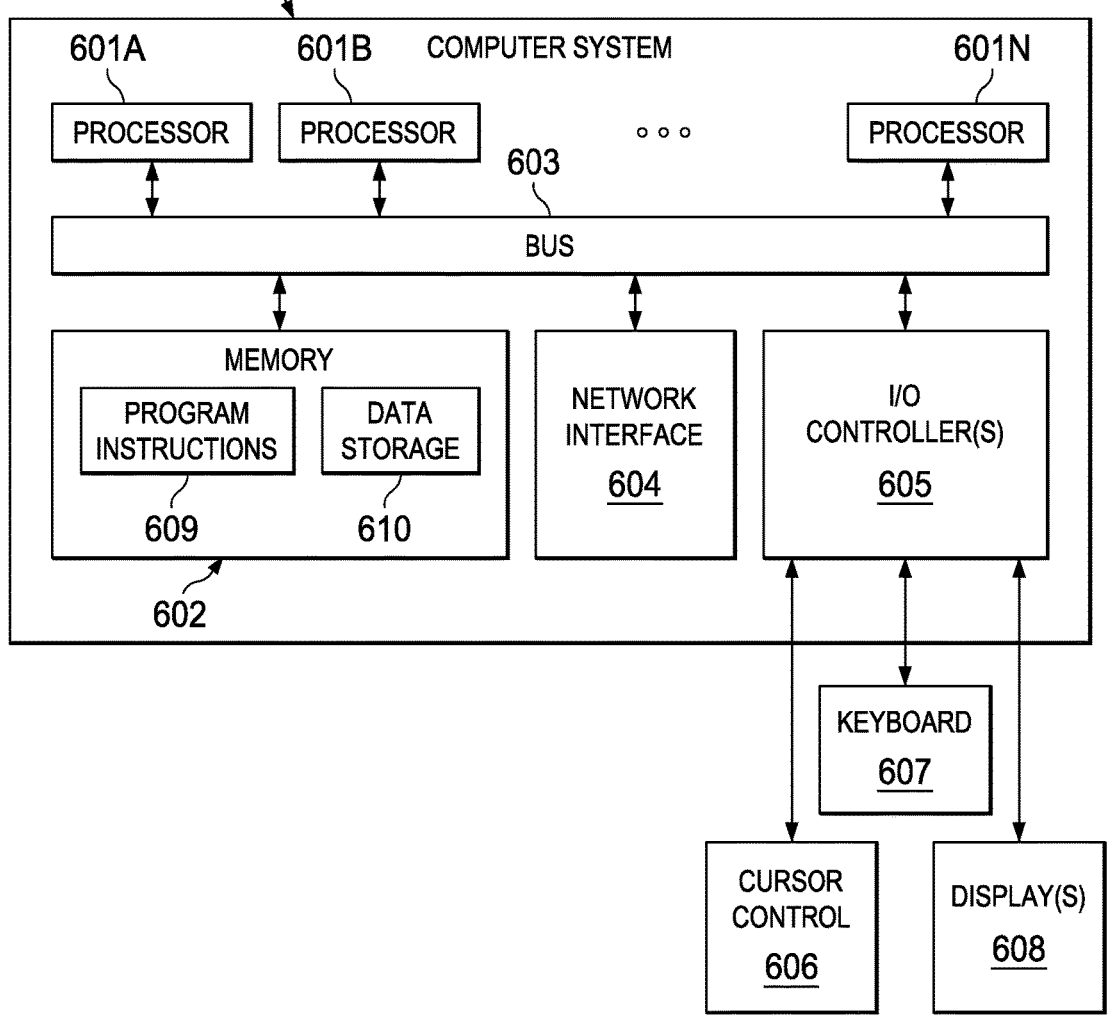

FIG. 6 is a schematic block diagram illustrating one embodiment of computer system according to the present embodiments.

Figure 7:
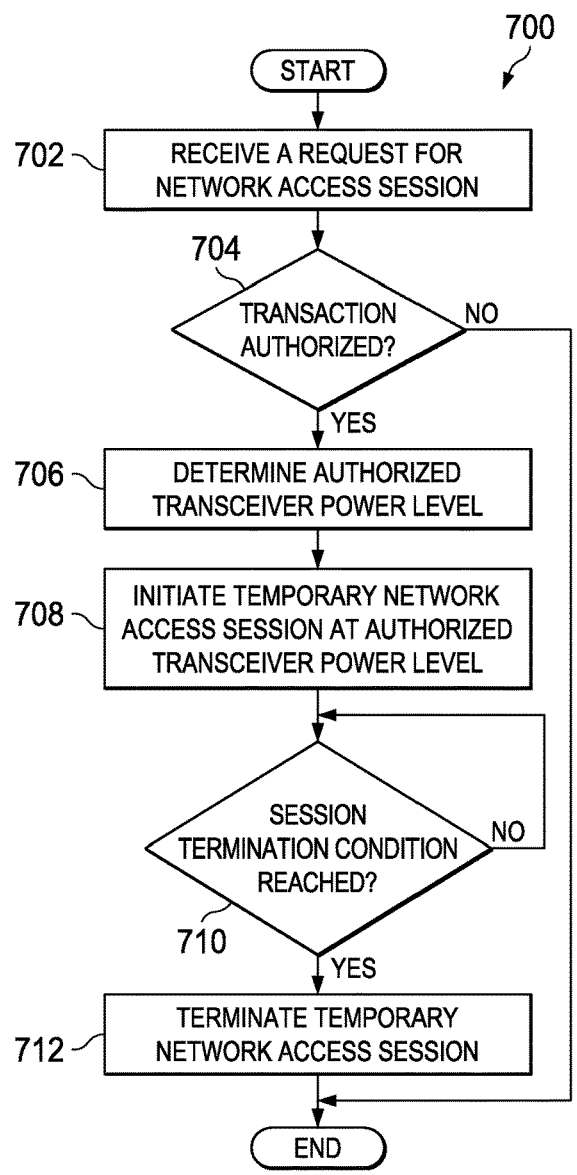

FIG. 7 is a schematic flowchart diagram illustrating one embodiment of a method for improved network security.

Figure 8:
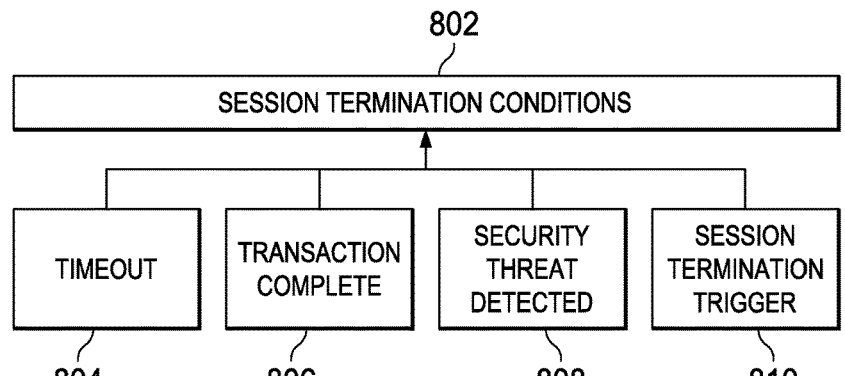

FIG. 8 is a diagram illustrating embodiments of session termination conditions.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1A illustrates one embodiment of a system 100 having improved network security. The system 100 may include a network 102 and one or more user interface devices 106 configured to access the network 102 via secure network access point 104. In one embodiment, the network access point 104 may provide access between the network 102 and the user interface device 106 on a session basis. The access may be restricted based upon one or more pre-set restriction criteria.

In one embodiment the network 102 is internal to the secure facility, such as an intranet system. The intranet system may include a Local Area Network (LAN), or a Wide Area Network (WAN) between a plurality of secure facility locations, or between a secure facility location and a third-party, such as a service provider. In another embodiment the network 102 may be a WAN that includes a network management facility. The network management facility may be operated by the secure facility administrators or by a third-party vendor. In a further embodiment, the network 102 may include access to the Internet. Components of the network 102 may include network routers, switches, hubs, firewalls and other security devices, servers, storage devices, quality of service devices, network access/routing backbone devices, transmission lines and transmission switches, repeaters and the like. One of ordinary skill in the art will recognize that network 102 may include various scales and configurations of devices for use in internetworking one or more computing devices. User interface device 106 may include a tablet device, a mobile data device, such as a smartphone or web-enabled personal data assistant. In other embodiments, user interface device 106 may include a personal computer, a laptop computer, a kiosk, RFID and other types of computing devices configured to interface with network 102 via secure network access point 104. In a particular embodiment, the user interface device 106 may include one or more wireless communication modules. The wireless communication module may include a WiFi module, a WiMAX module, a Near Field Communication (NFC) module, 3G or 4G mobile data module, or the like.

In another embodiment an RFID subsystem 109 may be incorporated into the Network Access Point 104. This RFID subsystem would be used in association with a RFID chip, that is incorporated into the User Interface Device 106 or an RFID device (bracelet, badge etc.) associated with the inmate. The RFID subsystem 109 may initiate the transaction event, via a separate RF connection between the Secure Network Access Point 104 and the User Interface Device 106. For example, access or authentication information may be passed via the RFID subsystem.

Secure network access point 104 may provide the user interface device 106 with data communication access to the network 102. For example, secure network access point 104 may provide a wireless data communication link between the user interface device 106 and/or the network 102. Embodiments of wireless communication links include WiFi links, such as IEEE 802.11x protocol links, Bluetooth and other Personal Area Network (PAN) links, WiMAX links, 3G or 4G mobile data access links, RFID, NFC links, or the like.

In one embodiment, secure network access point 104 may provide greater overall security to network 102 from attacks by user interface device 106 than conventional network access points. For example, secure network access point 104 may operate according to one or more security rules or profiles for enhancing security of the network 102. For example, secure network access point 104 may only provide temporary access to user interface device 106 during a user session, but may not provide access to user interface device 106 outside of the user session. Embodiments of methods for providing enhanced security which the secure network access point 104 may be configured to carry out are described herein.

FIG. 1B is a schematic block diagram illustrating one embodiment of a computing system 110 having improved network security. The system 110 may include network 102 and user interface 106 as described above. Additionally, system 110 may include secure network access point 104 and network security controller 108. Secure network access point 104 may be configured to operate in conjunction with network security controller 108 to provide enhanced network security. In another embodiment, network security controller 108 may be configured to control access provided by network access point 104 such that security is enhanced. User interface device 106 may be configured to connect to the network 102 directly through secure network access point 104, which then connects to the network 102 through network security controller 108. In another embodiment, user interface device 106 connects through network security controller 108, which then connects to network 102 through network access point 104. One of ordinary skill in the art may recognize a variety of alternative system configurations which may be suitable for use with the present embodiments.

For example, FIG. 1C is a schematic block diagram illustrating one embodiment of a computing system 120 having improved network security. The embodiment of FIG. 1C includes the network 102, the secure network access point 104, the user interface device 106 as described above. System 120 also includes network security controller 108, which may be coupled to the network 102, but may be located remotely from the secure network access point 104. In one embodiment, the secure network access point 104 may communicate with network security controller 108 over network 102 to obtain power level settings, gain settings, filter settings, and other controls for dynamically providing access to authorized user interface device 106, or other configuration information.

FIG. 2A is a diagram illustrating an embodiment of a system 200 for dynamic access control through power level management. In one embodiment, the system 200 includes a secure network access point 104. The secure network access point 104 may include one or more antennas 202 used for wirelessly communicating with the user interface device 106. The one or more antennas 202 may be configured to communicate using a dynamically settable power level. For example, the antenna 202 may be configured to communicate within a first range 204 at a first power level, within a second range 206 at a second power level, and at a third range 208 at a third power level. In addition the antenna and/or associated RF equipment may be shut off or filtered to terminate communications between the secure network access point 104 and the user interface device 106.

In one embodiment, the antenna 202 may be an omnidirectional antenna, for example those used in wireless access points which operate according to the IEEE 802.11 standards or other related WiFi standards. In a further embodiment, the antenna 202 may be suitable for WiMAX communications. In still other embodiment, the antenna 202 may be suitable for NFC communications. In still other embodiments, the antenna may be suitable for 3G or 4G mobile communications. In still further embodiments, a combination of antennas and/or communications modules may be used. For example, the secure wireless access point 104 may be configured to operate in the first range 204 using an NFC module, at the second range 206 using a WiFi module, and at the third range 208 using a WiMAX or mobile communications module. One of ordinary skill in the art will recognize a variety of embodiments that may be used alone or in combination according to the present embodiments.

In an embodiment, the first communication range 204 may be within a few feet of the secure network access point 104. In another embodiment, the first communication range 204 may be within a few inches of the secure network access point 104. In still other embodiments, the first communication range may be within the same room as the secure network access point 104. One of ordinary skill will recognize that the first communication range 204 may be any of a plurality of physical ranges from the network access point 104, and that the first communication range 204 will be set by the transceiver power level. In a further embodiment, the transceiver power level associated with the first communication range 204 may be preset or predetermined by a facility administrator or by an installation technician.

Similarly, one of ordinary skill will recognize that the second communication range 206 and the third communication range 208 may be determined in association with a transceiver power level. Additionally, it may be recognized that the second communication range 204 and the third communication range 208 may be any of a plurality of physical proximities from the network access point 104 as defined by the transceiver power level, but that generally speaking the second communication range 206 would be further from the secure network access point 104 than the first communication range 204 and closer than the third communication range 208. The boundaries of the third communication range 208 may be defined by the physical specifications of the transceiver module of the secure network access point 104 or by a maximum transceiver power level setting which may be predefined by a manufacturer or a facility administrator. In still further embodiments, any number of communication ranges may be employed by the secure network access point 104.

FIG. 2B illustrates another embodiment of a system 210 for dynamic access control through power level management. In one embodiment, the system 210 includes a secure network access point 104 having a directional antenna 212.

The directional antenna 212 may be steerable. For example, the directional antenna 212 may be electronically steerable using beam shaping, through control of a phased array of directional antenna elements, other radiation or reception pattern modification technologies or the like. In another embodiment, the directional antenna 212 may be mechanically steerable. For example, the directional antenna 212 may be mounted to a mechanical gimbal device configured to physically direct the directional antenna 212. In the example described, the directional antenna 212 may be configured to focus energy at a first communication region 214 and then steered to focus energy at a second communication region 216. In such an embodiment, only user interface devices located within one of the first communication region 214 or the second communication region 216 may communicate with the secure network access point 104.

In the embodiments described herein, the secure network access point 104 may include a transceiver module. In an embodiment, the transceiver module may include omnidirectional antenna 202 and/or directional antenna 212. In an embodiment, the transceiver module may include both receiver components and transmitter components. One of ordinary skill will recognize that the term "transceiver" has been used to simplify the present description and that the present embodiments are not limited to devices which include both a transmitter module and a receiver module, but that the term "transceiver" may encompass either a receiver module or a transmitter module individually or separately. Indeed, one of ordinary skill will recognize that the term "transceiver power level" may refer to a power level set for a receiver module alone, a power level set for a transmitter module alone, or to a transmitter power level and a receiver power level in combination. Further, one of ordinary skill in the art will recognize that the term "power level" is intended to encompass not only transmit amplifier power, but also receiver amplifier power levels. Additionally, the term "power level" is intended to encompass amplifier gain levels and also filter rejection levels. Indeed, the term "power level" refers to a power level of a communication signal communicated between the transceiver module and other components of the secure network access point 104.

FIG. 3 is a schematic block diagram illustrating one embodiment of a secure network access point 104. The secure network access point 104 may include a network interface 302 for connecting to the network 102. Connections to network 102 may include TCP/IP connections to routers, switches, or modems on the network. For example, network interface 302 may connect to a fiber optic modem, a cable modem, a Digital Subscriber Line (DSL) modem, a T-1 line, an Ethernet connection, or the like. In one embodiment, the network interface 302 could include a wireless interface, such as a WiMAX interface, or a cellular data communication interface.

In an embodiment, secure network access point 104 may include a wireless user interface 304. The wireless user interface 304 may include components for connecting to the user interface device 106 via a wireless communication link. For example, the wireless user interface 304 may include one or more wireless communication modules described above, including WiFi, WiMAX, or the like. Alternative embodiments may include an NFC module, a Bluetooth module, or the like.

In addition, secure network access point 104 may include logic, circuits, and/or modules for linking the network interface 302 and the wireless user interface 304. Such functions may be carried out by, for example, a data processor. One of ordinary skill in the art would recognize one or more methods for linking traffic between the interfaces 302, 304; therefore the specific methods are not discussed herein.

In one embodiment, for example the embodiment of FIG. 1A, the network security controller 108 may be integrated with the secure network access point 104. In an alternative embodiment, the network security controller 108 may have functionality and/or components that may be found both internal to the secure network access point 104 and external to the secure network access point 104, as shown, for example, in FIG. 1C. For example, the internal components may be configured to communicate with external components to receive information, such as a power level designation, a directional antenna orientation setting, a communication protocol designation, or the like. Further embodiments of the network security controller 108 are discussed with reference to the following figures.

FIG. 4 is a schematic block diagram illustrating one embodiment of a network security controller 108. In one embodiment the network security controller 108 may include one or more modules including a user interface 402, an access controller 404, a transaction monitor 406, a timer 408 and a session monitor 410. These modules may receive a request for access to a network interface device, determine an authorized duration of network access for the user interface device 106 and facilitate establishment of a temporary network access session between the user interface device 106 and the network 102.

The user interface 402 may be implemented in one or more of a variety of embodiments. For example, the user interface 402 may be coupled to the wireless user interface 304 for receiving communications from the user interface device 106. In another embodiment, the user interface 402 may be a separate device, such as a separate facility computer, kiosk, telephone system, or the like for accessing the network security controller 108 and collecting information to be used for establishing the temporary network access session, or causing the secure network access point 104 to set a power level suitable for communication with the user interface device 106.

In one example, the user interface 402 may include an NFC module configured to provide limited communications in an area within close proximity to the secure network access point 104. In such an embodiment, the NFC module may be configured to provide communication capabilities within the first range 204. The user interface device 106 may also include an NFC module configured to communicate authentication and/or authorization information with the network security controller over user interface 402. Upon determining that the user interface device 106 is authorized to communicate with the network 102 over the secure network access point 104, the network security controller 108 may set a transceiver power level for a WiFi module of the network access point 104 to communicate with the user interface device for a limited duration. Upon determination that a user session has terminated, the access controller 404 may cause the WiFi module to stop communicating with the user interface device by shutting off power, or significantly reducing the transceiver power of the WiFi module.

The access controller 404 may be coupled to the user interface device 402 in one embodiment. The access controller 404 may generate a transceiver power setting for establishing a temporary network access session between the user interface device 106 and the network 102. For example, the access controller 404 may set an authorized transceiver power level for a communication module of the secure network access point 104. In other embodiments, the access controller 404 may enable a link between the network interface 302 and one of the wired user interface 304 or the wireless user interface for a limited duration. In other embodiments, the access controller 404 may provide a Personal Identification Number (PIN), or password for enabling access to the network 102.

In one embodiment, transaction monitor 406 may track the progress of a transaction conducted between the user interface device 106 and the network 102. For example, an inmate in a correctional facility may request temporary access to the network from the access controller 404 via the user interface 402. The access controller 404 may generate a transceiver power level for establishing the temporary network access session, the duration of which is determined by the length of the transaction, such as the length of time required to download a media file from the network 102. The transaction monitor 406 may track the progress of the transaction and signal the end of the transaction upon completion. In response, the access controller 404 may set a second transceiver power level, such as zero power or a power level low enough to terminate communications with the user interface device 106. Thus, in one embodiment, the duration of the network access session may be determined dynamically in response to the progress of the transaction.

The network security controller 108 may set a time limit for the temporary network access session. The timer 408 may track the time during which the temporary network access session is active. Upon expiration of the time period, the access controller 404 may reduce the transceiver power level. Thus, in one embodiment, the duration of the network access session may be determined statically by the access controller 404. In some embodiments, the timer 408 may be used to determine whether the network access session has reached a predetermined duration threshold. In another embodiment, the timer 408 may be used to determine whether the network access session has been inactive for a predetermined threshold of time. The timer 408 may make such determinations directly, or in another embodiment, the access controller 404 may use timing information provided by the timer 408 to make the determinations.

In one embodiment, network security controller 108 may also include a session monitor 410. The session monitor 410 may be configured to track activity during a network access session. For example, session monitor 410 may receive information from transaction monitor 406 to determine whether a session is inactive. Session monitor 410 may also receive information from timer 408 to track the duration of session inactivity. In still other embodiments, session monitor 410 may prompt re-entry of a PIN or other access key(s) in response to session inactivity. The session monitor 410 may also track transactions conducted or attempted by user interface device 106. If an attempt to conduct an unauthorized transaction is made, the session monitor 410 may trigger termination of the network access session. For example, the session monitor 410 may communicate the trigger to the access controller 404, which may terminate the session by reducing the transceiver power level.

In another embodiment, session monitor 410 may facilitate a system administrator, monitor, or other third party to monitor the communication session between the user interface device 106 and the network 102 via the secure network access point 104. In such an embodiment, the session monitor 410 may provide information regarding the transactions being conducted, the time parameters of the session, and other information suitable for monitoring the transactions being conducted in the secure facility network.

FIG. 5 is a schematic block diagram illustrating one embodiment of a network security controller 108. In the depicted embodiment, the network security controller 108 may include the user interface 402, the transaction monitor 406, the timer 408, and/or the session monitor 410 as described in FIG. 4. In an embodiment, the access controller 404 may include one or more additional modules for controlling access to the network 102. For example, the access controller 404 may include a power controller 502, a gain controller 504, a signal filter controller 506, and an antenna controller 508. These various modules may perform various functions for dynamically controlling access to the network 102 through changing a transceiver power level.

The power controller 502 may be configured to terminate power to one or more components of the secure network access point 104 used for establishing the communication link with the user interface device 106. For example, once the session has expired, the power controller 408 may reduce Radio Frequency (RF) power on one or more communication channels used for communicating with the user interface device 106. In still a further embodiment, the power to one or more modules of the secure network access point 104 may be reduced or turned off rendering the secure network access point 104 inaccessible until it is reinitialized by an authorized user interface device 106 or by a system administrator or by another authorized system user.

In one embodiment, the power controller 502 may provide a variable transceiver power level to the transceiver (e.g. to a transceiver module coupled to antennas 202 and/or 212). For example, the power controller 502 may be selectable according to a predetermined condition, such as an authorized communication range associated with the user interface device 106. In another embodiment, the power controller 502 may cause a first communication module to communicate with the user interface device 106 at a first time, and then cause a second communication module to communicate with the user interface device 106 at a second time.

For example, the power controller 502 may supply power to a NFC communication module for conducting communication with the user interface device 106 for initiating a network access session. Once the network access session is established, the power controller 502 may supply power to a WiFi module for communicating with the user interface device 106 during the session. In such an embodiment, the secure network access point 104 may communicate at a first transceiver power level for communicating with the user interface device 106 within a first range 204 and may communicate at a second power level for communicating with the user interface device 106 within a second range 206.

In another example, the power controller 502 may cause a WiFi transceiver to communicate at a first transceiver power level associated with a first communication range 204 and at a second transceiver power level associated with a second communication range 206. In such an example, the user may bring the user interface device 106 within close proximity to the secure network access point 104 (within the first communication range 204) for establishing a network access session, and then may be free to move within a wider area (the second communication range 206) once the session is established.

In other embodiments, the power controller 502 may be configured to dynamically adjust the transceiver power level in response to a daily schedule. For example, the power controller 502 may cause the secure network access point 104 to communicate at a transceiver power level suitable for communication within the third communication range 208 during a recreation period or other facility-wide open access period. Then, once the open access period is over, the power controller 502 may cause the secure network access point 104 to operate at a lower transceiver power level associated with, for example, the first communication range 204, which may restrict the range of communication to relatively closer physical proximity to the secure network access point 104.

In one embodiment, the gain controller 504 may work in conjunction with the power controller 502 to set a transceiver power level of the secure network access point 104. The gain controller may be hardware defined, software defined, or a combination of hardware and software. In an embodiment, the gain controller 504 may operate on received and transmitted signals to increase or decrease overall signal strength or to improve Signal to Noise Ratio (SNR) of the signals. In one embodiment, gain controller may operate to control one or more amplifier circuits and/or one or more filter circuits in the secure network access point 104.

In an embodiment, the access controller 404 may include a signal filter controller 506. The signal filter controller may be configured to reject or decrease signal strength of certain signal frequencies. For example, a transmit filter may block transmission of signals over the transceiver. In another embodiment, a receiver filter may block signals received by the transceiver. The filters may be software defined, hardware defined, or a combination of hardware and software. One of ordinary skill will recognize a variety of signal filters which may be used in accordance with the present embodiments.

In one embodiment, the access controller 404 may include an antenna controller 508. In one embodiment, the antenna controller 508 may generate control signals for servos or motors controlling an antenna orientation on an antenna 212 mounting system. In another embodiment, the antenna controller 508 may control beam forming or beam steering components, where the antenna 212 is a phased array of antenna elements or other radiation or reception pattern modification technologies In some embodiments, secure network access point 104, the network security controller, and/or the user interface device 106 may be implemented or executed by one or more computer systems, an example of which is illustrated in FIG. 6. In various embodiments, computer system 600 may be a router, switch, a workstation, a network computer, a desktop computer, a laptop, a tablet device, or the like.

As illustrated, computer system 600 includes one or more processors 601A-N coupled to a system memory 602 via bus 603. Computer system 600 further includes network interface 604 coupled to bus 603, and input/output (I/O) controller(s) 605, coupled to devices such as cursor control device 606, keyboard 607, and display(s) 608. In some embodiments, a given entity (e.g., secure network access point 104) may be implemented using a single instance of computer system 600, while in other embodiments multiple such systems, or multiple nodes making up computer system 600, may be configured to host different portions or instances of embodiments.

In various embodiments, computer system 600 may be a single-processor system including one processor 601A, or a multi-processor system including two or more processors 601A-N (e.g., two, four, eight, or another suitable number). Processor(s) 601A-N may be any processor capable of executing program instructions. For example, in various embodiments, processor(s) 601A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 601A-N may commonly, but not necessarily, implement the same ISA. Also, in some embodiments, at least one processor(s) 601A-N may be a graphics processing unit (GPU) or other dedicated graphics-rendering device.

System memory 602 may be configured to store program instructions and/or data accessible by processor(s) 601A-N. For example, memory 602 may be used to store a software program. In various embodiments, system memory 602 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 602 as program instructions 609 and data storage 610, respectively. In other embodiments, program instructions and/or data may be received, sent or stored upon different types of computer-accessible media or on similar media separate from system memory 602 or computer system 600. Generally speaking, a computer-accessible medium may include any tangible, non-transitory storage media or memory media such as electronic, magnetic, or optical media—e.g., disk or CD/DVD-ROM coupled to computer system 600 via bus 603, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 603 may be configured to coordinate I/O traffic between processor 601, system memory 602, and any peripheral devices including network interface 604 or other peripheral interfaces, connected via I/O controller(s) 605. In some embodiments, bus 603 may perform any necessary protocol, timing or other data transformations to convert data signals from one component (e.g., system memory 602) into a format suitable for use by another component (e.g., processor(s) 601A-N). In some embodiments, bus 603 may include support for devices attached through various types of peripheral buses, such as a variant of the Peripheral Component Interconnect (PCI) bus standard or the Universal Serial Bus (USB) standard, for example. In some embodiments, the operations of bus 603 may be split into two or more separate components, such as a north bridge and a south bridge, for example. In addition, in some embodiments some or all of the operations of bus 603, such as an interface to system memory 602, may be incorporated directly into processor(s) 601A-N.

Network interface 604 may be configured to allow data to be exchanged between computer system 600 and other devices, such as other computer systems attached to network 102, or secure network access point 104 or user interface devices as shown in FIGS. 1A-C, for example. In various embodiments, network interface 604 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 605 may, in some embodiments, enable connection to one or more display terminals, keyboards, keypads, touch screens, scanning devices, voice or optical recognition devices, or any other devices suitable for entering or retrieving data by one or more computer system 600. Multiple input/output devices may be present in computer system 600 or may be distributed on various nodes of computer system 600. In some embodiments, similar I/O devices may be separate from computer system 600 and may interact with computer system 600 through a wireless connection, such as over network interface 604.

As shown in FIG. 6, memory 602 may include program instructions 609, configured to implement certain embodiments described herein, and data storage 610, comprising various data accessible by program instructions 609. In an embodiment, program instructions 609 may include software elements of embodiments illustrated in FIG. 7. For example, program instructions 609 may be implemented in various embodiments using any desired programming language, scripting language, or combination of programming languages and/or scripting languages. Data storage 610 may include data that may be used in these embodiments, for example to store lists of authorized user interface devices 106. In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

FIG. 7 is a schematic flowchart diagram illustrating one embodiment of a method 700 for improved network security. In one embodiment, the method 700 starts with receiving 702 a request for a network access session. The request may be received 702 from a user interface device 106 or via the user interface 402 of the network security controller 108. In further embodiments, the request may be received 702 via a telephone request line or an access request network.

If a transaction is authorized as determined at block 704, then the user interface 106 may determine 706 an authorized transceiver power level for communicating with the user interface device 106 and initiate 708 a temporary network access session with the secure network access point 104. If a session termination condition is reached at block 710, then the secure network access point 104 may terminate 712 the network access session.

FIG. 8 is a diagram illustrating embodiments of session termination conditions 802. In one embodiment a session termination condition may include a session timeout event 804. For example a session timeout event 804 may include a session duration threshold being met, or may include a session inactivity duration threshold being met. One of ordinary skill in the art may recognize other suitable timeout events 804.

A session termination condition 802 may also include a transaction completion event 806. For example a transaction completion event 806 may include the completion of a single transaction. In another embodiment, a transaction completion event 806 may include completion of an authorized set of transactions.

In an embodiment, a session termination condition 802 may include a security threat detection event 808. A security threat may include an unauthorized transaction being initiated by the user interface device 106. A security threat may also include a transaction on a list of threat transactions being initiated. One of ordinary skill will recognize a variety of transactions, such as upload of viruses or malware, which may constitute security threat events.

In still other embodiments, a session termination condition 802 may include a session termination trigger 810. The session termination trigger 810 may be initiated by the user by logging out of a user session. Alternatively, the session termination trigger 810 may be initiated by the secure network access point 104 in response to one or more preset conditions being met. In still a further embodiment, the session termination trigger 810 may be initiated by a system administrator, monitor, or other 3$^{rd}$ party user who is authorized to monitor transactions on the network 102.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
   receiving a request for a network session, wherein the request is received from a user operating a user interface device, and wherein the request includes authentication information;
   authenticating the user based on the authentication information;
   determining an authorized duration for the requested network session;
   determining an authorized range for the user interface device;
   determining a transceiver power level for communicating with the user interface device within the authorized range;
   setting a transceiver power level based on the power level determination;
   communicating with the user interface device at the transceiver power level for the authorized duration; and
   adjusting the transceiver power level upon the expiration of the authorized duration.

2. The method of claim 1, wherein the authorized duration is the time required for the user to complete a network transaction.

3. The method of claim 2, wherein adjusting the transceiver power level further comprises reducing the transceiver power level upon expiration of the authorized duration.

4. The method of claim 2, wherein the network transaction comprises downloading a media file.

5. The method of claim 1, wherein the transceiver power level is determined in response to a location of the transceiver.

6. The method of claim 1, wherein the transceiver power level is determined in response to a privilege setting associated with the user interface device.

7. The method of claim 1, wherein the transceiver power level is determined in response to a privilege setting associated with a user of the user interface device.

8. A system comprising:
   an interface configured to receive a request for a network session, wherein the request is received from a user operating a user interface device, wherein the request includes authentication information;
   an access controller configured to authenticate the user based on the authentication information and further configured to determine an authorized duration for the requested network session;
   a transceiver controller coupled to the receiver and configured to determine an authorized range for the user interface device and further configured to determine a transceiver power level for communicating with the user interface device within the authorized range for the authorized duration; and
   a transceiver coupled to the transceiver controller, and configured to communicate with the user interface device at the authorized transceiver power level for the authorized duration.

9. The system of claim 8, wherein the transceiver controller is further configured to determine an authorized duration of network access for the user interface device based on the length of time required for the user to complete a network transaction.

10. The system of claim 9, wherein the transceiver controller is further configured to reduce the transceiver power level upon expiration of the authorized duration.

11. The system of claim 9, wherein the network transaction comprises downloading a media file.

12. The system of claim 8, wherein the transceiver controller is further configured to determine the transceiver power level in response to a location of the transceiver.

13. The system of claim 8, wherein the transceiver controller is further configured to determine the transceiver power level in response to a privilege setting associated with the user interface device.

14. The system of claim 8, wherein the transceiver controller is further configured to determine the transceiver power level in response to a privilege setting associated with a user of the user interface device.

15. The system of claim 8, wherein the interface comprises a Radio Frequency Identification (RFID) subsystem configured to receive the request from the user interface device.

16. The system of claim 15, wherein the RFID subsystem is configured to receive user authentication information from the user interface device.

17. A tangible computer program product comprising computer executable code that, when executed by a data processing device, causes the computer to perform operations comprising:
- receiving a request for a network session, wherein the request is received from a user operating a user interface device, and wherein the request includes authentication information;
- authenticating the user based on the authentication information;
- determining an authorized range for the user interface device;
- determining an authorized duration for the requested session;
- determining a transceiver power level for communicating with the user interface device within the authorized range;
- setting a transceiver power based on the power level determination;
- communicating with the user interface device at the transceiver power level for the authorized duration; and
- adjusting the transceiver power upon reaching the end of the authorized duration.

18. The computer program product of claim 17, wherein the authorized duration is the time required for the user to complete a network transaction.

19. The computer program product of claim 18, wherein adjusting the transceiver power further comprises reducing the transceiver power level upon expiration of the authorized duration.

20. The computer program product of claim 17, wherein the network transaction comprises downloading a media file.

21. The computer program product of claim 17, wherein the transceiver power level is determined in response to a location of the transceiver.

22. The computer program product of claim 17, wherein the transceiver power level is determined in response to a privilege setting associated with the user interface device.

23. The computer program product of claim 17, wherein the transceiver power level is determined in response to a privilege setting associated with a user of the user interface device.

* * * * *